PHASE-SHIFT COMPUTER AND CONTROL SYSTEM

Filed Sept. 27, 1961 2 Sheets-Sheet 1

INVENTORS
GEORGE VASU
KIRBY W. HILLER
BY
J. O. Tresansky
ATTORNEYS.

PHASE-SHIFT COMPUTER AND CONTROL SYSTEM

Filed Sept. 27, 1961

INVENTORS
GEORGE VASU
KIRBY W. HILLER

BY

ATTORNEYS 3,250,904

PHASE-SHIFT COMPUTER AND CONTROL SYSTEM

George Vasu, 37825 Lorie Blvd., Avon Ohio, and Kirby W. Hiller, 494 Woodmere Road, Berea, Ohio Filed Sept. 27, 1961, Ser. No. 141,224
11 Claims. (Cl. 235—186)

The invention described herein may be manufactured and used by or for the Government of the United States of America for governmental purposes without the payment of any royalties thereon or therefor.

This invention relates to self-adaptive control systems and concerns particularly the employment of phase-shift computation for correction of the system operation. The present application is in part a continuation of our co-pending application Serial No. 141,221 filed September 27, 1961.

An object of the invention is to provide phase-shift computers of general application.

A further object is to provide signals suitable for direct recording of measured quantities.

A specific object of the invention is to avoid erratic operation and instability.

Other and further objects, features and advantages of the invention will become apparent as the description proceeds.

In carrying out the invention in accordance with a preferred form thereof, a control system is rendered self-adaptive by providing it with means for automatically computing phase shift. The computed phase shift is compared with an appropriate reference thereby generating an error signal. The error signal is then utilized to control dynamic performance by automatically maintaining selected values of phase shift.

The present invention, being concerned with phase shift, relates particularly to certain kinds of systems which are designed to operate best from single frequency function as an operating signal. In multiplier type phase-shift computers, in accordance with the invention, system output and input signals are multiplied for the purpose of computing phase shift. The system is arranged for having available or selecting a single frequency sinusoidal signal. The multiplier type system will produce a phase shift indication even in the presence of strong noise in the system output. A suitable input signal can be obtained directly from an oscillator or from the control system by selecting a single stable frequency with a tuned filter. Such a frequency may be injected into the control system to insure its existence.

A better understanding of the invention will be afforded by the following detailed description considered in conjunction with the accompanying drawing in which:

FIG. 1 constitutes a block diagram of a phase-shift computer of the multiplier type;

Figure 1:
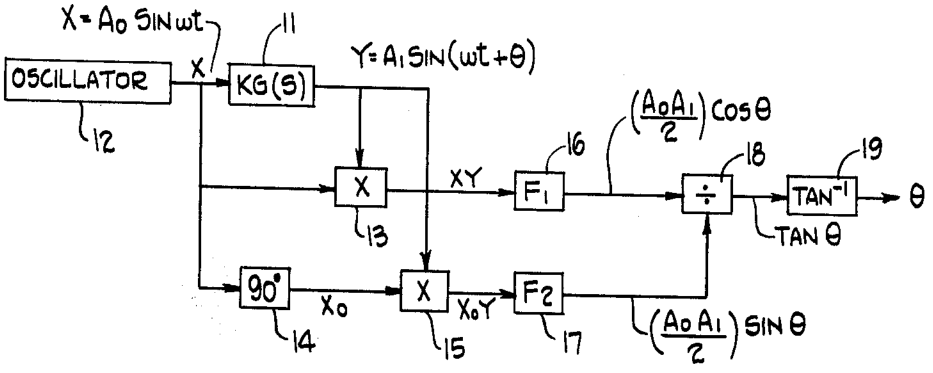

FIG. 1 of the drawing illustrates a computer for measuring phase shift continuously and automatically. It is assumed that the measurement of phase shift is desired for a system 11, the transfer function of which is KG($s$), where K represents gain for a given point on the operating curve of the system, and G($s$) represents the dynamic function of a general system component or group of components, $s$ being the Laplacian operator. The computer is adapted for the general condition where both input signal amplitude and ratio of system output to input amplitude are variable.

Signals suitable for automatic and continous computation of phase shift are obtained by utilizing a test signal $x$ generated by an oscillator 12. The test signal, assumed sinusoidal with variable amplitude $A_0$, may be represented by the equation $$x=A_0 \sin wt$$

The test signal $x$ disturbs the system, generating an output $y$. For simplicity in analysis, it will be assumed that the perturbations are small and that there are no abrupt non-linearities. The output can therefore be approximated by a sine wave designated as $$y=A_1 \sin (wt+\theta)$$

where $A_1$ is a factor representing peak amplitude;
$w$ is $2\pi$ times the frequency or angular velocity in radians per second;
$t$ is time; and
$\theta$ is the phase shift in radians.

As illustrated in the drawing, the computer comprises a multiplying circuit 13 responsive to signals $x$ and $y$, a 90-degree phase shifter 14 responsive to signal $x$, a multiplying circuit 15 responsive to the output of the phase shifter 14 and to the signal $y$, filters 16 and 17 connected to output terminals of multiplying circuits 13 and 15, respectively, a dividing circuit 18 with input terminals connected to output terminals of the filters 16 and 17 and an inverse tangent or arctangent function generator 19 having an input terminal connected to the output terminal of the divider 18 and having an output terminal at which a signal appears representing phase shift between the input and output signals of the system 11. The multiplying, phase shifting, dividing and inverse function circuits are conventional circuits or function generators and do not constitute a part of the present invention and therefore need not be described in detail. The filters 16 and 17 may be conventional filters of the low pass type, in the particular embodiment illustrated being designed to pass the D.-C. components $(A_0A_1/2)\cos\theta$ and $(A_0A_1/2)\sin\theta$.

The output $y$ is multiplied by the input $x$, giving $$xy=(A_0 \sin wt)[A_1 \sin (wt+\theta)]$$
$$=\frac{A_0A_1}{2}[\cos(-\theta)-\cos(2wt+\theta)]$$

The signal $xy$ is thus composed of a steady component $(A_0A_1/2)\cos(-\theta)$ and an oscillatory component $[(A_0A_1/2)\cos(2wt+\theta)]$. Filter 16 removes the oscillatory component, leaving at the output of the filter 16 the steady component $[(A_0A_1/2)\cos(-\theta)]$.

In a similar manner, $y$ is multiplied by $x_0$, which is obtained by shifting the original signal $x$ by 90-degrees. This gives $$x_0y=(A_0 \cos wt)[A_1 \sin (wt+\theta)]$$
$$=\frac{A_0A_1}{2}[\sin\theta+\sin(2wt+\theta)]$$

The filter 17 removes the periodic term $$\frac{A_0A_1}{2}\sin(2wt+\theta)$$

leaving as its output $(A_0A_1/2)\sin\theta$.

The division of the output of one filter by the other results in a signal proportional to the tangent or the cotangent of $\theta$ depending upon which way the connections of the division circuit 18 are made. It is assumed that the input to the divider 18 from the filter 16 is connected to the terminal of the divider 18 representing the denominator or divisor and the terminal of the divider 18 to which the filter output 17 is connected represents the numerator so that the quotient is a tangent. In this case the circuit 19 is an arctangent function generator and converts the output of the divider 18 into a signal proportional to the phase shift $\theta$.

Thus, the system described gives a continuous indication of the phase shift $\theta$ for the frequency in question, independent of variations in the amplitude of the signal $x$ and the system output to input amplitude ratio.

It will be understood that when phase shift or $\theta$ variations are small, or when an output strictly proportional to $\theta$ is not required, the function generator 19 can be eliminated.

Figure 3:
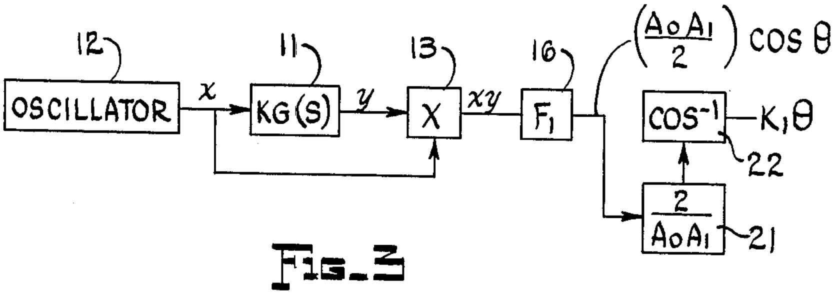
FIG. 3 is a block diagram of a simplified version of the type of phase-shift computer illustrated in FIG. 1.

If the application is such that the input amplitude $A_0$ and the amplitude ratio $A_1$ divided by $A_0$ remains constant, a simplified system illustrated in FIG. 3 may be employed in which the elements 14, 15 and 17 are omitted and the divider 18 is replaced by a gain unit 21 of gain $2/A_0A_1$, thus making the coefficient of cos $\theta$ equal to unity by introducing the reciprocal factor $2/A_0A_1$, and the arctangent generator 19 is replaced by an arc cos generator 22.

The phase-shift computer described can be used in a variety of ways. It may be applied to a system to obtain continuous or intermittent measurement of phase shift to aid control system studies. More important, however, is its application to achieve automatic control of phase shift in an overall system by incorporating phase-shift computers in the actual control system. The application of such computers is described generally in the parent application co-pending herewith, Serial No. 141,221 filed September 27, 1961.

In an application where measurement of amplitude ratio is not indicative of variations in performance of the system it may be necessary to maintain the performance of the loop by varying a time constant or by controlling phase shift between parts of the loop.

Figure 2:
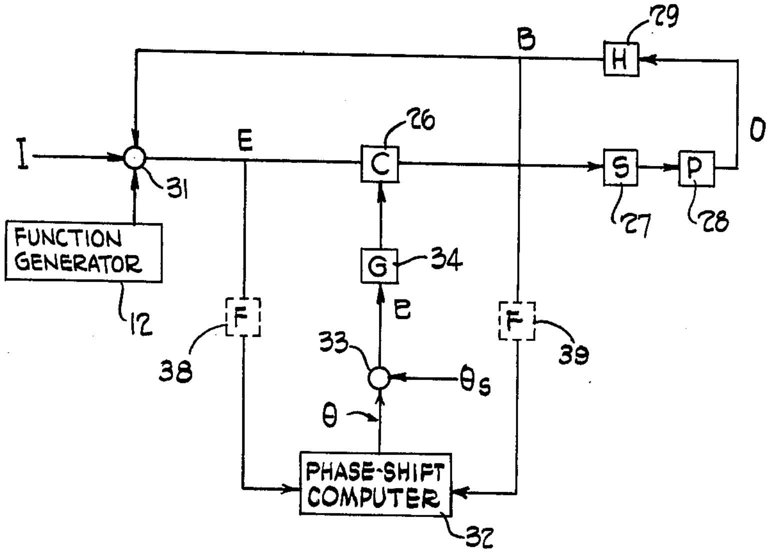
FIG. 2 is a block diagram of a closed-loop control system illustrating the manner of utilizing the computer of FIG. 1.

One arrangement of a system for providing automatic control of phase shift utilizing the computer of FIG. 1 is illustrated in FIG. 2. FIG. 2 represents a single closed-loop system consisting of a main controller 26, a servo 27 and the plant 28 to be operated with a feedback device 29 from the output of the plant 28. An adder 31 receives the input signal I together with the feedback signal from the feedback unit 29 and the output of the oscillator or function generator 12.

In order to control the phase shift the error signal E and the feedback signal B are sensed by the computer 32 which selects from the signals E and B by tuned filters 38 and 39 respectively the desired frequency for phase-shift computation and then performs the operations as hereinbefore mentioned with regard to FIG. 1, thus computing the phase shift from E to B. In general signals E and B will contain many frequency components and therefore tuned filters 38 and 39 are desired to select the frequency component for which the phase-shift computer was designed. However, a system design might be considered wherein the function generator 12 generates a strong single frequency signal such that the signals at E and B are predominately of a single frequency component, thereby enabling elimination of the tuned filters 38 and 39. The measured or computed phase shift $\theta$ is compared with a desired set value $\theta_S$ by a comparator 33 which produces an error signal $e$. This error $e$ then actuates a phase controller 34 which varied a time constant in the main controller 26 causing a shift in the phase within the main controller 26 as required to saisfy the error signal $e$.

Figure 4:
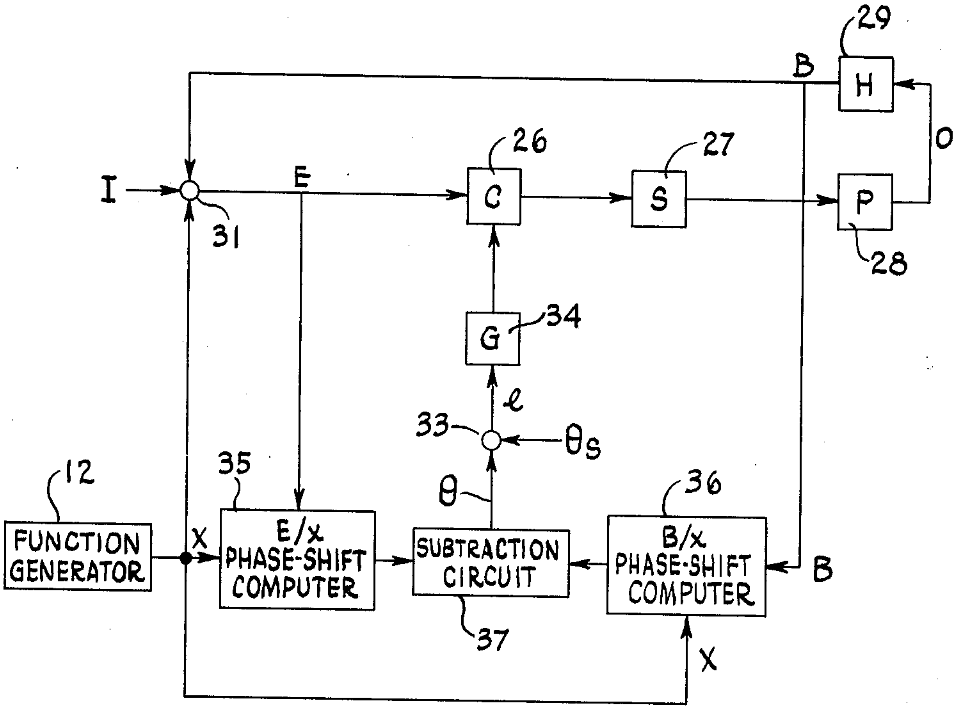
FIG. 4 is a block diagram of a phase-shift control system with multiple computers.

For applications in which a specified input to the phase-shift computer is desired, alternative systems may be employed. An example of such a system is illustrated in FIG. 4. The system of FIG. 4 employs multiple phase-shift computers.

A function generator 12 again produces a signal $x$ that is injected into the main loop and into two phase-shift computers 35 and 36 of the type illustrated in FIG. 1. The computer 35 provides a measure of the phase shift from $x$ to a point in the main loop such as E. The computer 36 provides a measure of the phase shift from $x$ to some other desired point in the loop such as B. A third computer 37 is provided which may be a simple difference circuit. Accordingly, the computer 37 generates the phase shift between the two selected points E and B in the main loop. The comparator 33 compares the measured value $\theta$ with the set value $\theta_S$ of phase shift.

Certain embodiments of the invention and certain methods of operation embraced therein have been shown and particularly described for the purpose of explaining the principle of operation of the invention and showing its application, but it will be obvious to those skilled in the art that many modifications and variations are possible and it is intended, therefore, to cover all such modifications and variations as fall within the scope of the invention.

What is claimed is:

1. A phase-shift computer for a system having input and output connections, said computer comprising in combination means for supplying selected frequency components to said input connection, a low pass filter to pass said selected frequency components, means for multiplying input and output signals of the system and supplying them to the filter, and an arc cos function generator connected to the filter output.

2. A computer, as in claim 1, and including a gain component interposed between said filter and said arc cos function generator.

3. A phase-shift computer for the input and output signals of a system comprising in combination means for supplying signals of a selected frequency to the system, means for multiplying the input and output signals to form mixed signals, means for selecting low frequency components from the mixed signals and means for introducing a reciprocal factor of the input and output amplitudes to produce a signal representing phase shift.

4. A computer, as in claim 3, including means for producing an inverse function of the signal output.

5. A computer, as in claim 4, wherein the means for producing an inverse function is a device for converting a trigometric function into an angle indication.

6. A computer, as in claim 4, wherein the means for producing an inverse function is an arc cos function generator.

7. A phase-shift computer for a system having input and output connections, said computer comprising in combination a substantially sinusoidal oscillator with an output connection to the system input connection, first and second multipliers, each having input connections from the oscillator and from the system output connections, a 90-degree phase shifter interposed in one of said multiplier input connections, low pass filters tuned for passing the D.-C. components of said multipliers, a divider having input connections from the filters, the divider having an output connection, and an arctangent function generator connected to the divider output connection, whereby a signal appears in the arctangent function generator proportional to phase shift of the system.

8. A phase-shift computer for a system having input and output connections, said computer comprising in combination means for supplying a selected frequency to said input connection, first and second low pass filters to pass selected frequency components, means for multiplying input and output signals of the system and supplying them to the first filter, means for multiplying input and output signals and applying them to the second filter with means for quadrature shifting one of said signals before multiplying, and means for dividing the output of one filter by the other and converting the output to an inverse function to produce a signal proportional to phase shift of the system output and input signals.

9. An automatic phase-shift control system for maintenance of phase relationship between two points in a control system, which points are referred to as the feedback signal point and the error signal point which comprises the combination of means for directing signals of a known frequency to the error signal point, a phase-shift computer responsive to phase relationship between the feedback point and the error point, said computer having input connections from said points and an output connection, an adjustable controller interposed in the system beyond the error signal point having an input connection for adjusting the system phase shift in response to variations in system signals directed to the input connection, a phase-shift controller having an output connection connected to the adjustable controller input connection, said phase-shift controller having an input connection, a comparator having an input connection connected to the phase-shift computer output connection and an output connection applied to the input connection of the phase controller and a second input connection, and means for supplying a set value of phase to the second input connection of the comparator.

10. An apparatus, as in claim 9, wherein filters are interposed in the connections from the error point of the system to the phase-shift computer input connection and from the feedback point of the system to the phase-shift computer input connection, respectively.

11. In a control system, means for maintaining a predetermined relationship of phase between two points in a control system, which points are referred to as first signal point and the second signal point respectively, an adjustable controller interposed in the system beyond the said first point having an input connection for adjusting the system phase shift in response to variations in input signals to the adjustable controller, a pair of phase-shift computers, said phase-shift computers having input connections respectively from the first and second points of the system and each having an output connection, a subtractor having input connections from the output connections of the phsae-shift computers and an output connection, means for directing selected frequency components into the system and into said phase-shift computers, a comparator having an input connection from the subtractor output connection and having an output connection, a phase-shift controller having an output connection connected to the adjustable controller input connection, said phase-shift controller having an input connection connected to the comparator output connection, and means for supplying a set value of phase shift to the comparator for comparison with the subtractor output, said comparator having an error output, said error output being supplied to the input connection of the phase-shift controller.

References Cited by the Examiner

UNITED STATES PATENTS

| | | | |
|---|---|---|---|
| 2,902,644 | 9/1959 | McDonald | 324—77 X |
| 2,907,950 | 10/1959 | Raisbeck | 324—57 |
| 2,932,471 | 4/1960 | Exner et al. | 235—151 X |
| 3,013,721 | 12/1961 | Foster et al. | 235—151 |

OTHER REFERENCES

Chelustkin: "The Design and Application of Correlation Control," Automatic Control, pages 16 to 20, May 1958.

MALCOLM A. MORRISON, *Primary Examiner.*

DARYL W. COOK, *Examiner.*